Jan. 28, 1969 P. L. CLAR 3,424,993

TRANSISTOR PROTECTION CIRCUIT

Filed Feb. 9, 1966

INVENTOR.
Philip L. Clar

BY

Mueller, Aichele & Rauner

ATTYS.

3,424,993
TRANSISTOR PROTECTION CIRCUIT
Philip L. Clar, Phoenix, Ariz., assignor to Motorola, Inc., Franklin Park, Ill., a corporation of Illinois
Filed Feb. 9, 1966, Ser. No. 526,300
U.S. Cl. 330—24 8 Claims
Int. Cl. H03f 3/04

ABSTRACT OF THE DISCLOSURE

A diode detector circuit is responsive to a predetermined voltage on the collector of a transistor in an amplifier output stage having a polarity opposite to the collector power supply polarity to supply a control signal to other stages of the amplifier. The amplifier responds to the control signal to reduce the AC driving signal to the output stage for eliminating the overvoltage condition without disconnecting any power supplies.

This invention relates to circuits for the protection of semiconductors, and more particularly for the protection of transistors, which are operating at or near their maximum voltage ratings, from burn out due to variations in load impedance.

The development of transistors and other semiconductor components have made possible a reduction in the size and power consumption of electronic devices. In high powered transistorized transmitters, it is often necessary to operate the output stages at or near the maximum voltage rating of the transistors used in order to obtain optimum gain and power output. When such a transmitter is operated in the vicinity of other high powered transmitters, signals from the nearby transmitters may induce voltages on the antenna of the miniature transmitter. This received voltage may be coupled back to the output of the transistor and added to the radio frequency voltage normally found at this point. This can occur even though the nearby high powered transmitter is transmitting on a different frequency than that to which the miniature transmitter is tuned. Since the voltage supplied to the final amplifier stages of the transmitter is as high as the ratings of the transistor will permit, the addition of the voltage induced on the antenna may cause the voltage appearing at the output of the power amplifier transistor to exceed its maximum rating and a transistor may breakdown. When the transistor breaks down, heavy current flows through the transistor causing it to burn out.

Also, if the tuned output circuit of the output transistor is mistuned on the inductive side, the voltage across the tuned circuit may be high enough to cause voltage breakdown of the transistor. This is more likely to occur if the resistive load presented by the antenna is removed from the tuned circuit. In the practical case, both these incidents can occur in the tuning of a final amplifier, if an antenna defect should arise or if the antenna should strike an object. Prior art devices which protect transistors from excessive current are not entirely satisfactory as they are slow in their response to the over current condition and some devices are self-destructive in operation.

It is, therefore, an object of this invention to provide a transistor amplifier with an improved protective device which will limit the drive signals supplied to the amplifier to a safe value while maintaining the amplifier output at a high level.

Another object of this invention is to provide a transistor amplifier wherein a transistor operates near or at its maximum voltage ratings and is protected from burn out caused by excessive voltage across the transistor.

A feature of this invention is the provision of a protective circuit for a transistor amplifier wherein voltage peaks above a predetermined threshold voltage are detected to provide a bias voltage which is applied to a driver stage to limit the drive signal to the transistor.

Another feature of this invention is the provision of a protective circuit for a transistor amplifier wherein the voltage peaks which are detected are of a polarity opposite to that of the power supply voltage applied to the transistor.

The invention is illustrated in the drawings wherein.

In practicing this invention a transistor amplifier stage, as might be used in a radio transmitter, is provided with a peak voltage detector which develops a control signal when the peak voltage across the transistor exceeds a predetermined value. The control signal thus developed is supplied to the driver stage of the amplifier to control the bias of that stage whereby controlling the drive signal applied to the amplifier being protected. Since the control signal is not developed until the peak voltage across the transistor exceeds a predetermined value, the protected stage operates at its maximum ratings until it is necessary to reduce the drive signal to protect the transistor. The detector used is reverse biased by the normal power supply potential applied to the transistor amplifier stage thus eliminating the requirement for separate bias networks.

Figure 1:
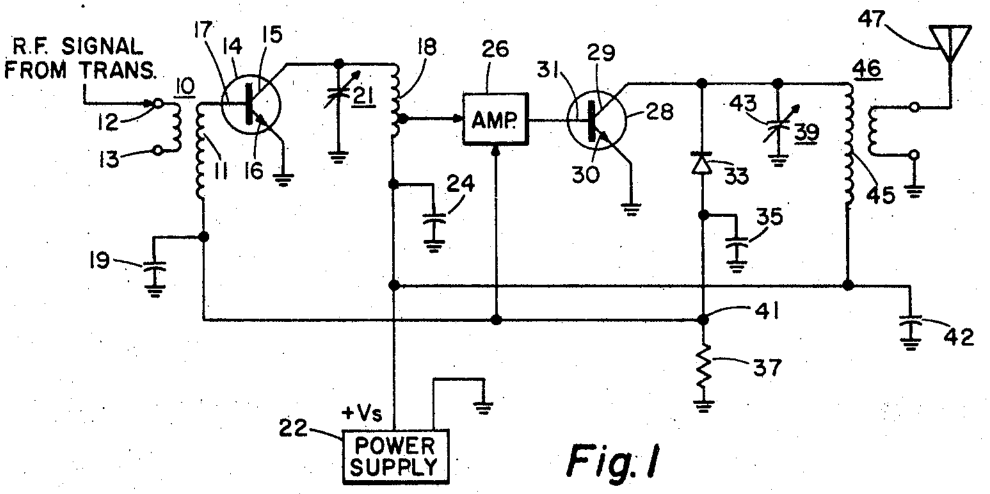
FIG. 1 is a schematic diagram of a transistor amplifier incorporating the protective features of the invention.

Referring to FIG. 1 there is shown the final stages of a transmitter using transistors. A driving signal from the prior stages of the transmitter is applied across terminals 12 and 13 and coupled to base 17 of transistor 14 by transformer 10. One end of the secondary winding 11 of transformer 10 is bypassed to a reference potential by capacitor 19. Emitter 16 of transistor 14 is connected to the reference potential and collector 15 of transistor 14 is coupled to amplifier 26 by tuned circuit 21. Power is supplied to collector 15 of transistor 14 through inductance 18 which is coupled to power supply 22. Capacitor 24 coupled between inductance 18 and the reference potential acts to bypass any alternating current signals appearing at this point.

The output of amplifier 26 is applied to base 31 of transistor 28. Emitter 30 of transistor 28 is connected to the reference potential and collector 29 of transistor 28 is coupled to antenna 47 by tuned circuit 39 consisting of capacitor 43 and transformer 46. Collector 29 of transistor 28 is coupled to power supply 22 by primary 45 of transformer 46. Capacitor 42 coupled between primary 45 and the reference potential acts to bypass alternating current signals appearing at this point.

A protective circuit consisting of diode 33 and resistor 37 is coupled in series between collector 29 of transistor 28 and a reference potential. Capacitor 35 coupled between diode 33 and the reference potential acts to bypass alternating current signals appearing at this point. Resistor 37 is coupled to amplifier 25 and to secondary 11 of transformer 10.

When the transmitter shown in FIG. 1 is in operation, the power supply voltage applied to collector 29 of transistor 28 is such that the DC potential appearing on the collector is approximately one-half of the breakdown voltage of transistor 28. This permits maximum signal swing and thus maximum power output from the transmitter without the peak voltage appearing across the transistor exceding the breakdown voltage of the transistor. If tuned circuit 39 is mistuned on the inductive side or if the antenna 47 is removed or its impedance changed because it strikes some object such as a bush or tree, the peak voltage of the signal appearing at collector 29 may increase beyond the maximum safe peak voltage rating of the transistor. When operating near high powered transmitters, antenna 47 may pick up strong signals which can be coupled back to collector 29 of transistor 28. These signals may be coupled back to collector 29 even though tuned circuit 39 is tuned to a different frequency than that of the signal received on antenna 47. The signals thus received are added to the output signal appearing on collector 29 and may increase the peak voltage appearing across the transistor 28 to a value greater than its breakdown voltage.

In order to prevent the voltage appearing across transistor 28 from reaching the breakdown voltage of the transistor a protective circuit, including diode 33 and resistor 37, is coupled to the final amplifier and one or more of the driver amplifiers. In the circuit of FIG. 1, transistor 28 is an NPN transistor and thus collector 29 of transistor 28 would be normally biased by a positive direct current potential. The cathode of diode 33 is connected to collector 29 of transistor 28 so that the positive potential appearing at collector 29 will bias diode 33 to nonconduction. If transistor 28 were a PNP transistor, the polarity of the supply voltage applied to the collector would be negative and the anode of diode 33 would be connected to collector 29. In each case, diode 33 is reversed biased by the supply potential applied to collector 29 of transistor 28.

Figure 2:
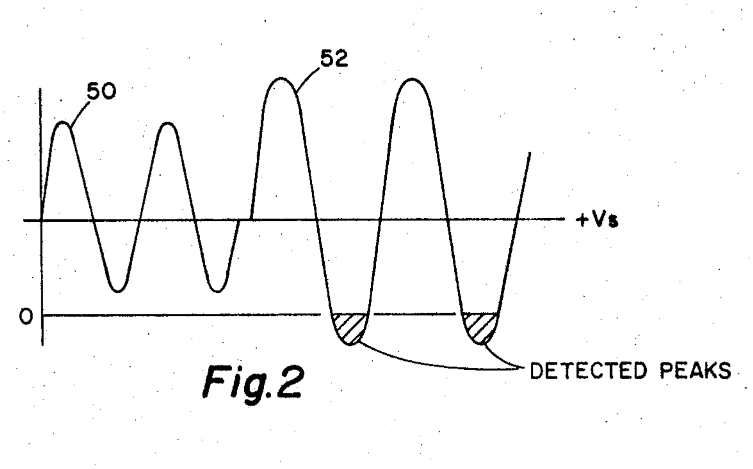
FIG. 2 is a curve illustrating the operation of the protective features.

Referring to FIG. 2, there is shown a curve of the voltage appearing at collector 29 of transistor 28. In normal operation, the peak voltage of the signal, as shown by curve 50, is less than a predetermined threshold and the negative peaks are not sufficient to bias diode 33 to conduction. Therefore, no current flows through resistor 37 and junction point 43 remains at ground potential. However, if the peak voltage of the signal increases beyond the bias voltage applied to collector 29, as shown in curve 52, the peak negative voltage of the RF signal is sufficient to bias diode 33 to conduction and a current flows through resistor 37 reducing the potential at junction point 41. The potential at junction point 41 is applied to base 17 of transistor 14 through secondary 11 of transformer 10. The reduction in potential at junction point 41 thus biases transistor 14 so as to reduce the drive signal supplied by transistor 14 to amplifier 26 and thus reducing the drive signal applied to the output of transistor 28. The reduction in the drive signal applied to transistor 28 reduces the peak voltage at collector 29 to a safe value so that the breakdown voltage of transistor 28 is not exceeded. As shown in FIG. 1, junction 41 may also be connected to amplifier 26 to adjust the bias at this amplifier to further reduce the drive signal applied to the final stage. The bias signal developed across resistor 37 may be applied to any number of driver amplifier stages as required.

Figure 3:
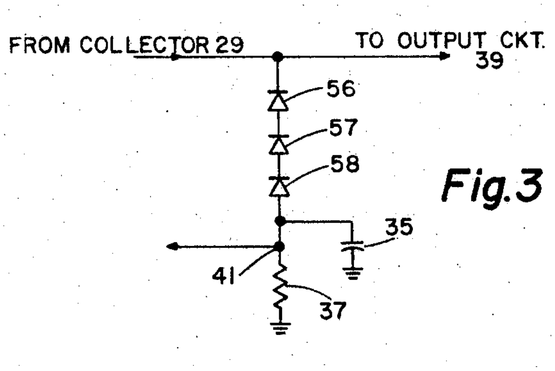
FIG. 3 is a schematic diagram of a portion of the protective circuit illustrating another embodiment thereof.

FIG. 3 illustrates a second embodiment of the invention. Those portions of the circuit which are the same as FIG. 1 have the same reference numerals. In FIG. 3, the protective circuit has been modified to include three diodes 56, 57 and 58 coupled in series between the collector 29 and junction point 41. Connecting the diodes in series reduces the effective capacitance of the reversed biased diodes and thus reduces the loading of the protective circuit on the amplifier. In addition, by increasing the number of diodes (using the same type of diode) the voltage breakdown of the diode protective circuit is increased.

Thus, a simple circuit for protecting the output transistor of an amplifier from voltage breakdown has been shown. By reverse biasing the diodes with the normal bias supply, the circuit can be incorporated in existing amplifiers without the need for separate bias supplies to maintain the diodes in an off condition during the times the signal amplitude is normal. The circuit shown provides a rapid control of the peak output voltage across final transistors of a power amplifier to prevent the peak voltage from building up to a value where voltage breakdown will result.

I claim:

1. A protective circuit for preventing burnout of transistor means by the application of a voltage thereto in excess of the breakdown voltage thereof, the transistor means having driving means coupled thereto for providing an alternating current driving signal therefor, said protection circuit including in combination, power supply means coupled to the transistor means for providing a potential of a particular polarity thereto and a reference potential, unidirectional current-conducting detector means coupled to said transistor means and to said reference potential and poled to conduct current when the voltage across said transistor means is opposite to said particular polarity, and responsive to a voltage greater than a predetermined magnitude of polarity opposite to said particular polarity to conduct current and operative to develop a control signal from said current, first circuit means coupling said detector means to the driving means for applying said control signal thereto, the driving means being responsive to said control signal to reduce said alternating current driving signal so that the magnitude of the voltage across the transistor means is reduced to a value less than the breakdown voltage thereof and burnout of the transistor means is prevented.

2. The protection circuit of claim 1 in which said driving means includes a plurality of amplifier means coupled in cascade, said first circuit means coupling said detector means to each of said plurality of amplifier means for applying said control signal thereto, each of said amplifier means being responsive to said control signal to reduce the driving signal so that the magnitude of the voltage across the transistor means is reduced to a value less than the breakdown voltage thereof and burnout of the transistor means is prevented.

3. The protection circuit of claim 1 in which the transistor means includes a first transistor having an emitter coupled to a reference potential and base and collector electrodes, second circuit means coupling said power supply means to said collector electrode of said first transistor for providing a potential of a particular polarity thereat, said detector means including diode means coupled to said collector electrode of said first transistor and resistance means connected between said diode means and said reference potential, said diode means being poled to conduct in response to a voltage between said collector and emitter electrodes of said first transistor of a polarity opposite to said particular polarity whereby a current flows through said resistance means to develop said control signal thereacross, the driving means including a second transistor having an emitter electrode coupled to said reference potential, a collector electrode coupled to said base electrode of said first transistor and a base electrode, said first circuit means coupling said resistance means to said base electrode of said second transistor to apply said control signal thereto to reduce the driving signal so that the magnitude of the voltage between said collector and emitter electrodes of said first transistor is reduced to a value less than the breakdown voltage thereof and burnout of said first transistor is prevented.

4. The protection circuit of claim 1 in which said detector means includes diode means coupled to the transistor means, said diode means being poled to conduct in response to a voltage across the transistor means of a polarity opposite to said particular polarity to thereby develop said control signal.

5. The protection circuit of claim 3 in which said diode means includes a plurality of diodes connected in series and further connected to said collector electrode of said first transistor, said plurality of diodes being poled to conduct in response to a voltage between said collector and emitter electrodes of said first transistor of a polarity opposite to said particular polarity.

6. The protection circuit of claim 4 in which said diode means includes a plurality of diodes connected in series and coupled to the transistor means, said plurality of diodes being poled to conduct in response to a voltage across the transistor means of a polarity opposite to said particular polarity.

7. The protection circuit of claim 4 for use in a carrier wave transmitter and in which the transistor means is coupled to antenna circuit means.

8. The protection circuit of claim 4 in which said detector means includes, resistance means coupled between said diode means and a reference potential, said diode means being poled to conduct in response to a voltage across the transistor of a polarity opposite to said particular polarity and above a predetermined magnitude whereby a current flows through said diode means and said resistance means, said resistance means being responsive to said current to develop said control signal.

References Cited

UNITED STATES PATENTS

| | | | |
|---|---|---|---|
| 3,015,781 | 1/1962 | Eklov | 330—15 |
| 3,262,016 | 7/1966 | Martin | 317—33 |
| 3,268,825 | 8/1966 | Mathes | 330—29 X |

FOREIGN PATENTS

| | | | |
|---|---|---|---|
| 920,053 | 3/1963 | Great Britain. | |

JOHN KOMINSKI, *Primary Examiner.*

LAWRENCE J. DAHL, *Assistant Examiner.*